March 9, 1965  J. R. HECKROTTE  3,172,282
ANTI-TAMPERING CUT-OFF VALVE COVER
Filed Aug. 9, 1963  2 Sheets-Sheet 1
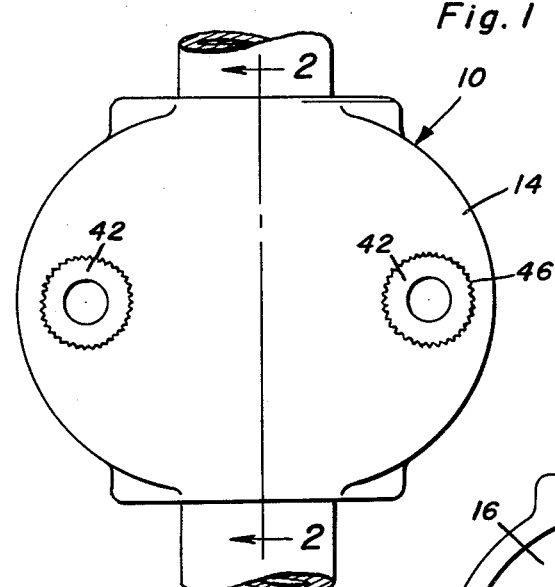
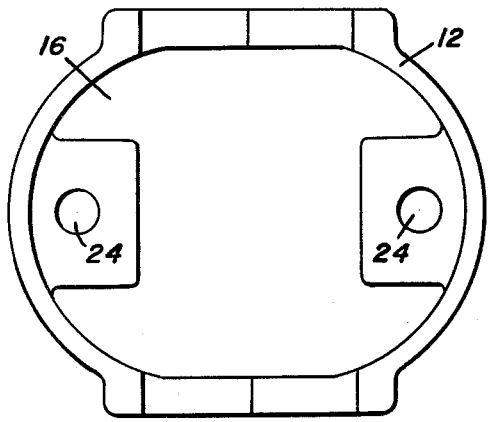
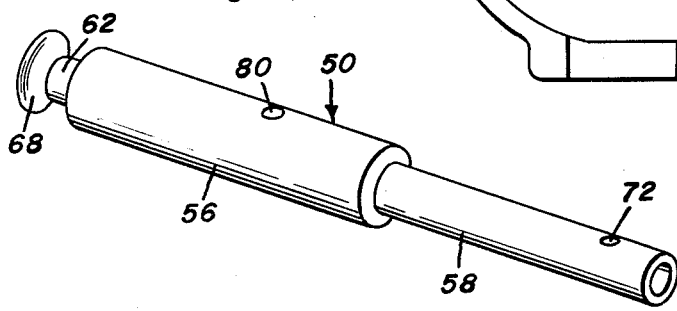
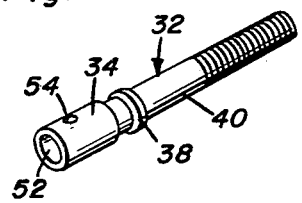
John R. Heckrotte
INVENTOR.

March 9, 1965  J. R. HECKROTTE  3,172,282
ANTI-TAMPERING CUT-OFF VALVE COVER
Filed Aug. 9, 1963  2 Sheets-Sheet 2

John R. Heckrotte
INVENTOR.

United States Patent Office 3,172,282
Patented Mar. 9, 1965

3,172,282
ANTI-TAMPERING CUT-OFF VALVE COVER
John R. Heckrotte, 3731 W. Wilshire, Phoenix 9, Ariz.
Filed Aug. 9, 1963, Ser. No. 300,965
3 Claims. (Cl. 70—178)

This invention relates to an improved housing or shield element which may be placed over a device and locked in such a manner so as to prevent ready removal of the same and access to the device.

It is one of the primary objects of this invention to disclose a tamper-proof housing including a pair of mating clamp elements having their middle portions oppositely expanded and recessed to form an article-enclosing pocket wherein cooperating means carried within the clamp elements may lock them together about the article. While this invention will be specifically disclosed in use with a valve housing or shield, it will be understood that an anti-tampering device of the character to be described can easily be adapted for use with safes, vending machines or any other similar article.

Another object of this invention is to provide an anti-tampering device of the character already indicated wherein the clamping elements are held together by rotatable lock means completely enclosed within a pair of aligned recesses in said elements. Novel key means are provided for breaking and making said connection by rotating said lock means in a novel fashion.

A more specific object of this invention is to provide a combination shield, lock, and key unit the locking portion of which holds the shield unit tightly clamped about an article to be protected. The lock is specifically provided with an axially opening hollow head portion positioned within a recess in the shield and further comprising a transverse notch in said head. The novel key of the present invention includes a plunger axially slidable within a sleeve and a ball captively held between the sleeve and a camming surface formed at the end of the plunger. Upon actuation of the plunger, the ball is adapted to be cammed into a transverse aperture in the sleeve, which aperture may be aligned with the transverse notch in the hollow head of the lock whereby a positive rotatable driving connection is established between the key means and lock whereby the lock may be opened to allow opening of the shield and access to the device housed therein.

Still another object of this invention resides in the fact that said lock comprises a threaded fastener element threadedly connecting the clamping portions of the shield together thereby minimizing the number of parts used in the device and providing for ease of maintenance and replacement.

Another object of this invention resides in the provision of means positioned in the entrance of the recess housing said lock, wherein access to said lock is substantially precluded except by means of the novel key to hereinafter be described.

The final object of this invention specifically resides in its simplicity of construction, almost foolproof use for the purpose for which it is intended, and ready commercial adaptability.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in end elevation of the housing or shield comprising the subject matter of the instant invention shown enclosing a valve structure.

FIGURE 4 is a view in end elevation of one of the clamping elements of the shield or housing.

FIGURE 5 is a perspective view of the key used in the present invention.

FIGURE 6 is a perspective view of the lock used in the shield or housing to lock the clamp elements thereof together.

Figure 2:
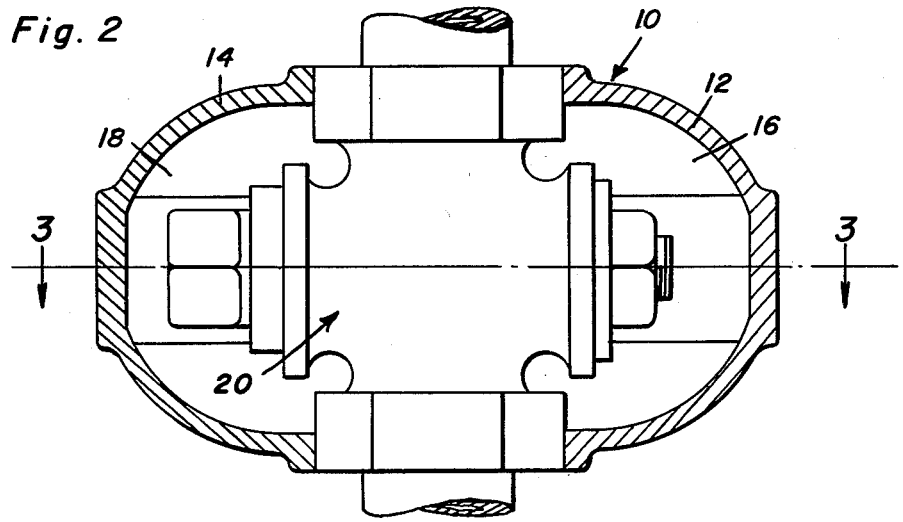
FIGURE 2 is a sectional view taken substantially along the plane indicated by the line 2—2 of FIGURE 1.

Referring now to the drawings in detail, the housing or shield 10 comprising the subject matter of the instant invention is constructed from a pair of clamp elements 12 and 14. The pair of mating clamp elements 12 and 14 have their middle portions oppositely expanded and recessed as shown at 16 and 18 to form an article-enclosing pocket and as shown in the drawings, such an article may be a valve 20 of the type commonly interposed in water and gas service pipes near where the latter are cut in on the mains, or adjacent to the meters. Therefore, the shield or housing 10 will substantially preclude tampering with the valve 20 if it cannot be easily removed.

In order to lock the housing or shield 10 about the valve 20, a pair of aligned recesses 22 and 24 are formed on opposite sides of each of the clamp elements 12 and 14. For purposes of description, it will only be necessary to describe the locking structure on one side of said elements, it being understood that the locking structure employed on the other side is identical. In order to align the recesses 22, 24, opposite sides of the clamp element 14 are formed with a notch 26 which is adapted to receive a longitudinally extending tongue 28 on the clamp element 12. Therefore, the elements may be quickly positioned and aligned about the valve structure 20 by merely seating the tongues 28 in the notches 26.

Figure 3:
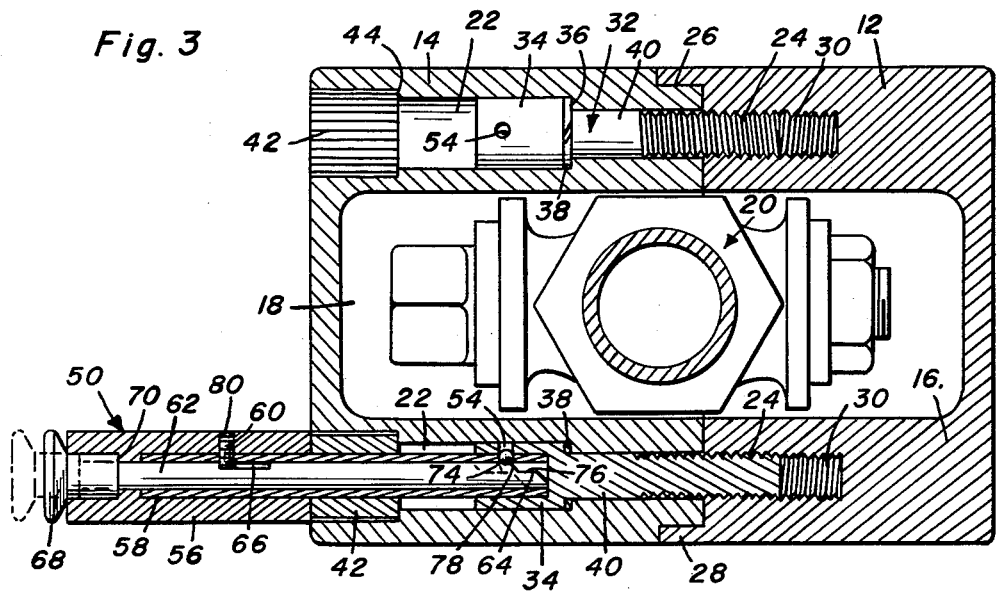
FIGURE 3 is a sectional view taken substantially along the plane indicated by the line 3—3 of FIGURE 2, and further showing the key used in the present invention inserted for operation within the lock incorporated in the housing or shield.

The recess 24 is threaded as shown at 30 in order to receive a threaded locking element 32. The locking element 32 is completely enclosed within the recesses 22, 24 and has an enlarged head 34 which abuts against an annular shoulder 36 in the recess 22. Therefore, the locking element 32 may be threaded into the threaded recess 30 in the clamp portion 12 through the clamp portion 14 until the head 34 and coaxial lock washer 38 slidable upon the shank 40 abuts the annular shoulder 36. As shown in FIGURE 3, access to the threaded locking element is substantially precluded inasmuch as it is enclosed completely within the housing 10. To prevent removal of the locking element 32 from the recess 22 and to provide for limited movement of the threaded locking element 32 only a distance sufficient to clear the threaded recess 24, a bushing such as 42 is positioned in the entrance of the recess 22 and abuts against an annular shoulder 44. The bushing 42 is serrated as indicated at 46 whereby it may be forced into the recess 22, biting into the edges thereof whereby rotation of the bushing 42 is prevented. The inner diameter of bushing 42 permits the insertion of a key element generally indicated by the numeral 50 in order that the threaded locking element may be rotated so as to enable separation of the clamps 12 and 14.

The head of the threaded locking element 32 is hollow as shown at 52 and further includes a transverse notch or aperture 54 through a side wall of the head. The diameter of the opening 52 corresponds to the internal diameter of the bushing 42 whereby the key 50 may be pushed through the bushing 42 and into the hollow head 34. The key 50 is provided with an outer sleeve 56 to which an inner sleeve 58 is rigidly secured by means of a setscrew such as 60. Telescopically slidable within the inner and outer sleeves is a plunger 62 having a camming surface 64 at one end thereof. The movement of the plunger within the sleeves is limited due to a notch 66 in the upper surface of the plunger adapted to abut the setscrew 60. Also, the plunger is formed with an enlarged head 68 adapted to abut a shoulder 70 within the sleeve 56. The sleeve 58 is formed with a transverse aperture 72 adjacent one end thereof which is adapted to be positioned and aligned with the transverse aperture or notch 54 in the hollow head 34 of the locking element 32. This is shown in FIGURE 3, for example. A ball 74 is frictionally held between the camming surface 64 of the plunger 62 and the sleeve 58. The ball 74 is of a diameter slightly larger than the diameter of the transverse aperture 72 in the sleeve 58 whereby the ball 74 cannot fall out of the aperture 72. Thus, the ball 74 is held captive in the sleeve 58 adjacent the camming portion 64 of the plunger 62. It should also be noted that the camming surface 64 of the plunger 62 comprises a horizontal portion 76 and an inclined portion 78.

Therefore, referring specifically to FIGURE 3, the locking element 32 may be unthreaded by passing the sleeve 58 through the bearing 42 and into the hollow head 34 of the locking element 32. The plunger 62 is then depressed as shown in FIGURE 3 from the dotted line position to the full line position. If the apertures 54 and 72 are aligned, the ball 74 will ride up the inclined portions 78 of the camming surface 64 through the aperture 72 and into the notch or aperture 54 in the hollow head 34. However, this will not be possible if the apertures are not aligned and in this case, the key 50 may be rotated by grasping the outer sleeve 56 and rotating it keeping pressure on the plunger head 68 until the ball 74 enters the aligned apertures. With the parts positioned as shown in FIGURE 3, a positive rotatable driving connection is established between the key and lock. Therefore, upon rotation of the key through the sleeve 56, the threaded locking element 32 may be withdrawn from the threaded recess 30 until it abuts up against the bearing 42. The clamp elements 12 and 14 may then be separated. To close the device, the aforementioned procedure is reversed and the recesses 22 and 24 automatically aligned due to the tongue and notch connection at the edges of the clamp elements. When the key 50 is withdrawn from the hollow head 34, the ball will ride down the inclined portions 78 of the camming surface 64 until it rests on the horizontal portion 76, thereby releasing the driving connection between the key and locking element. This is done by merely pulling the head 68 of the plunger 62 to the dotted line position as shown in FIGURE 3. A seal 80 may be positioned over the setscrew 60 to keep it from being worked loose whereby the various parts of the key can be integrally maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a tamper-proof housing including a pair of mating clamp elements having their middle portions oppositely expanded and recessed to form an article-enclosing pocket, cooperating means carried within said clamp elements for locking them together about said article, said means including a first recess through one of said elements aligned with a second recess in the other of said elements, rotatable lock means completely enclosed within said aligned recesses connecting said elements together, said lock means including an axially opening hollow head portion having a transverse notch, key means for breaking and making said connection by rotating said lock means receivable within said hollow head, said key means including a sleeve having a transverse aperture adapted to be aligned with the transverse notch in the hollow head, a plunger axially slidable within said sleeve having a camming surface at one end thereof, ball means captively held between said sleeve and camming surface adjacent the transverse aperture in the sleeve adapted to be cammed by said camming surface upon axial movement of said plunger into the aligned transverse notch in said hollow head and aperture in said sleeve whereby a positive rotatable driving connection is established between said key means and lock means.

2. The structure of claim 1 wherein said second recess is threaded and said lock means includes threaded fastener means threadedly connecting said clamp elements together.

3. The structure of claim 1 wherein a non-rotatable tubular bearing is positioned in the entrance of said first recess, said bearing precluding removal of the lock means from said first recess.

References Cited by the Examiner
UNITED STATES PATENTS

| | | | |
|---|---|---|---|
| 1,800,708 | 4/31 | Wartian | 70—19 |
| 2,018,346 | 10/35 | Busby | 70—14 |

ALBERT H. KAMPE, *Primary Examiner.*